United States Patent
Badr et al.

(10) Patent No.: US 12,141,709 B1
(45) Date of Patent: *Nov. 12, 2024

(54) PROVIDING CONTEXTUAL ACTIONS FOR MOBILE ONSCREEN CONTENT

(71) Applicant: GOOGLE LLC, Mountain View, CA (US)

(72) Inventors: Ibrahim Badr, Zurich (CH); Mauricio Zuluaga, Adliswil (CH); Aneto Okonkwo, Zurich (CH); Gökhan Bakir, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,402

(22) Filed: Jun. 29, 2023

Related U.S. Application Data

(63) Continuation of application No. 17/324,249, filed on May 19, 2021, now Pat. No. 11,734,581, which is a
(Continued)

(51) Int. Cl.
*G06N 5/022* (2023.01)
*G06F 3/04817* (2022.01)
(Continued)

(52) U.S. Cl.
CPC ......... *G06N 5/022* (2013.01); *G06F 3/04817* (2013.01); *G06F 3/0482* (2013.01);
(Continued)

(58) Field of Classification Search
None
See application file for complete search history.

(56) References Cited

U.S. PATENT DOCUMENTS

| | | |
|---|---|---|
| 5,731,844 A | 3/1998 | Rauch et al. |
| 5,946,647 A | 8/1999 | Miller et al. |

(Continued)

FOREIGN PATENT DOCUMENTS

| | | |
|---|---|---|
| CN | 101075236 | 11/2007 |
| CN | 101201827 | 6/2008 |

(Continued)

OTHER PUBLICATIONS

Bar-Ilan, et al., "Methods for comparing rankings of search engine results", 2005, 19 pages. dated 2005.

(Continued)

*Primary Examiner* — Syed A Roni
(74) *Attorney, Agent, or Firm* — Gray Ice Higdon

(57) ABSTRACT

Systems and methods provide an application programming interface to offer action suggestions to third-party applications using context data associated with the third-party. An example method includes receiving content information and context information from a source mobile application, the content information representing information to be displayed on a mobile device as part of a source mobile application administered by a third party, the context information being information specific to the third party and unavailable to a screen scraper. The method also includes predicting an action based on the content information and the context information, the action representing a deep link for a target mobile application. The method further includes providing the action to the source mobile application with a title and a thumbnail, the source mobile application using the title and thumbnail to display a selectable control that, when selected, causes the mobile device to initiate the action.

20 Claims, 8 Drawing Sheets

Related U.S. Application Data continuation of application No. 16/702,248, filed on Dec. 3, 2019, now Pat. No. 11,017,299, which is a continuation of application No. 15/386,771, filed on Dec. 21, 2016, now Pat. No. 10,535,005.

(60) Provisional application No. 62/413,174, filed on Oct. 26, 2016.

(51) Int. Cl.
    *G06F 3/0482*    (2013.01)
    *G06F 9/54*      (2006.01)
    *G06F 40/134*    (2020.01)
    *H04L 9/40*      (2022.01)
    *G06F 8/61*      (2018.01)
    *H04W 88/02*     (2009.01)

(52) U.S. Cl.
    CPC .............. *G06F 9/54* (2013.01); *G06F 40/134* (2020.01); *H04L 63/08* (2013.01); *G06F 8/61* (2013.01); *H04W 88/02* (2013.01)

(56) References Cited

U.S. PATENT DOCUMENTS

| | | |
|---|---|---|
| 6,662,226 B1 | 12/2003 | Wang et al. |
| 7,054,917 B1 | 5/2006 | Kirsch et al. |
| 7,421,153 B1 | 9/2008 | Ronca et al. |
| 7,548,915 B2 | 6/2009 | Ramer et al. |
| 7,822,759 B2 | 10/2010 | MacLaurin et al. |
| 7,840,502 B2 | 11/2010 | Li et al. |
| 7,917,514 B2 | 3/2011 | Lawler et al. |
| 8,090,222 B1 | 1/2012 | Baluja et al. |
| 8,131,786 B1 | 3/2012 | Bengio et al. |
| 8,150,911 B2 | 4/2012 | Bell et al. |
| 8,204,966 B1 | 6/2012 | Mendis et al. |
| 8,255,386 B1 | 8/2012 | Annau et al. |
| 8,280,414 B1 | 10/2012 | Nourse et al. |
| 8,341,156 B1 | 12/2012 | Westgate et al. |
| 8,347,237 B2 | 1/2013 | Bier et al. |
| 8,452,720 B2 | 5/2013 | Zhou et al. |
| 8,452,799 B2 | 5/2013 | Zhou et al. |
| 8,468,110 B1 | 6/2013 | Podgorny et al. |
| 8,543,397 B1 | 9/2013 | Nguyen |
| 8,571,319 B2 | 10/2013 | Balasubramanian et al. |
| 8,577,671 B1 | 11/2013 | Barve et al. |
| 8,645,325 B2 | 2/2014 | Anderson et al. |
| 8,700,604 B2 | 4/2014 | Roseman et al. |
| 8,767,497 B2 | 7/2014 | Marumoto et al. |
| 8,799,061 B1 | 8/2014 | Chatterjee et al. |
| 8,954,836 B1 | 2/2015 | Look et al. |
| 8,977,639 B2 | 3/2015 | Petrou et al. |
| 9,081,868 B2 | 7/2015 | Zhang et al. |
| 9,165,406 B1 | 10/2015 | Gray et al. |
| 9,176,984 B2 | 11/2015 | Hull et al. |
| 9,276,883 B2 | 3/2016 | Zhang et al. |
| 9,405,377 B2 | 8/2016 | Li |
| 9,424,668 B1 | 8/2016 | Petrou et al. |
| 9,582,482 B1 | 2/2017 | Sharifi et al. |
| 9,703,541 B2 | 7/2017 | Sharifi et al. |
| 9,798,708 B1 | 10/2017 | Sharifi et al. |
| 9,811,352 B1 | 11/2017 | Sharifi et al. |
| 9,824,079 B1 | 11/2017 | Sharifi et al. |
| 9,852,156 B2 | 12/2017 | Petrou et al. |
| 9,916,328 B1 | 3/2018 | Sharifi et al. |
| 9,965,559 B2 | 5/2018 | Marcin et al. |
| 10,055,390 B2 | 8/2018 | Sharifi et al. |
| 10,535,005 B1 | 1/2020 | Badr et al. |
| 10,970,646 B2 | 4/2021 | Sharifi et al. |
| 11,017,299 B1 | 5/2021 | Badr et al. |
| 2004/0117750 A1 | 6/2004 | Skoll et al. |
| 2005/0083413 A1 | 4/2005 | Reed et al. |
| 2005/0278317 A1 | 12/2005 | Gross et al. |
| 2006/0047639 A1 | 3/2006 | King et al. |
| 2006/0080594 A1 | 4/2006 | Chavoustie et al. |
| 2006/0106844 A1 | 5/2006 | Naick et al. |
| 2006/0156222 A1 | 7/2006 | Chi et al. |
| 2006/0161534 A1 | 7/2006 | Carson et al. |
| 2006/0221409 A1 | 10/2006 | Cohen et al. |
| 2006/0253491 A1 | 11/2006 | Gokturk et al. |
| 2007/0008321 A1 | 1/2007 | Gallagher et al. |
| 2007/0047781 A1 | 3/2007 | Hull et al. |
| 2007/0143345 A1 | 6/2007 | Jones et al. |
| 2007/0168379 A1 | 7/2007 | Patel et al. |
| 2007/0233671 A1 | 10/2007 | Oztekin et al. |
| 2008/0114604 A1 | 5/2008 | Wei et al. |
| 2008/0176606 A1 | 7/2008 | Kim |
| 2008/0235018 A1 | 9/2008 | Eggen et al. |
| 2008/0275701 A1 | 11/2008 | Wu et al. |
| 2008/0281974 A1 | 11/2008 | Slothouber et al. |
| 2008/0301101 A1 | 12/2008 | Baratto et al. |
| 2009/0005003 A1 | 1/2009 | Hartwell |
| 2009/0006388 A1 | 1/2009 | Ives et al. |
| 2009/0036215 A1 | 2/2009 | Saeki |
| 2009/0063431 A1 | 3/2009 | Erol et al. |
| 2009/0138466 A1 | 5/2009 | Henry et al. |
| 2009/0183124 A1 | 7/2009 | Sridhar et al. |
| 2009/0204641 A1 | 8/2009 | Chambers |
| 2009/0228573 A1 | 9/2009 | Asakawa et al. |
| 2009/0228777 A1 | 9/2009 | Henry et al. |
| 2009/0252413 A1 | 10/2009 | Hua et al. |
| 2009/0282012 A1 | 11/2009 | Konig et al. |
| 2009/0319449 A1 | 12/2009 | Gamon et al. |
| 2010/0010987 A1 | 1/2010 | Smyth et al. |
| 2010/0060655 A1 | 3/2010 | Huang |
| 2010/0088612 A1 | 4/2010 | Jia et al. |
| 2010/0250598 A1 | 9/2010 | Brauer et al. |
| 2010/0262928 A1 | 10/2010 | Abbott |
| 2010/0280983 A1 | 11/2010 | Cho et al. |
| 2010/0306249 A1 | 12/2010 | Hill et al. |
| 2010/0313141 A1 | 12/2010 | Yu et al. |
| 2011/0072455 A1 | 3/2011 | Pickelsimer et al. |
| 2011/0125735 A1 | 5/2011 | Petrou |
| 2011/0128288 A1 | 6/2011 | Petrou et al. |
| 2011/0131160 A1 | 6/2011 | Canny et al. |
| 2011/0131235 A1 | 6/2011 | Petrou et al. |
| 2011/0145692 A1 | 6/2011 | Noyes et al. |
| 2011/0167340 A1 | 7/2011 | Moore et al. |
| 2011/0191676 A1 | 8/2011 | Guttman et al. |
| 2011/0225152 A1 | 9/2011 | Beaudreau et al. |
| 2011/0238768 A1 | 9/2011 | Habets et al. |
| 2011/0246471 A1 | 10/2011 | Rakib |
| 2011/0258049 A1 | 10/2011 | Ramer et al. |
| 2011/0275358 A1 | 11/2011 | Faenger |
| 2011/0283296 A1 | 11/2011 | Chun |
| 2011/0307478 A1 | 12/2011 | Pinckney et al. |
| 2011/0307483 A1 | 12/2011 | Radlinski et al. |
| 2012/0044137 A1 | 2/2012 | Oddiraju et al. |
| 2012/0083294 A1 | 4/2012 | Bray et al. |
| 2012/0084292 A1 | 4/2012 | Liang et al. |
| 2012/0092286 A1 | 4/2012 | O'Prey et al. |
| 2012/0117058 A1 | 5/2012 | Rubinstein et al. |
| 2012/0158751 A1 | 6/2012 | Tseng |
| 2012/0159340 A1 | 6/2012 | Bae et al. |
| 2012/0191840 A1 | 7/2012 | Gordon |
| 2012/0194519 A1 | 8/2012 | Bissell et al. |
| 2012/0216102 A1 | 8/2012 | Malla |
| 2012/0323898 A1 | 12/2012 | Kumar et al. |
| 2013/0073988 A1 | 3/2013 | Groten et al. |
| 2013/0080447 A1 | 3/2013 | Ramer et al. |
| 2013/0091463 A1 | 4/2013 | Nordstrom et al. |
| 2013/0097507 A1 | 4/2013 | Prewett |
| 2013/0108161 A1 | 5/2013 | Carr |
| 2013/0110809 A1 | 5/2013 | Locker et al. |
| 2013/0111328 A1 | 5/2013 | Khanna et al. |
| 2013/0117252 A1 | 5/2013 | Samaddar et al. |
| 2013/0173604 A1 | 7/2013 | Li et al. |
| 2013/0254217 A1 | 9/2013 | Xu |
| 2013/0263098 A1 | 10/2013 | Duda et al. |
| 2013/0290110 A1 | 10/2013 | LuVogt et al. |
| 2013/0325844 A1 | 12/2013 | Plaisant |
| 2013/0346431 A1 | 12/2013 | Erol et al. |
| 2014/0025706 A1 | 1/2014 | Barve et al. |
| 2014/0029810 A1 | 1/2014 | Barr et al. |

(56) References Cited

U.S. PATENT DOCUMENTS

| | | |
|---|---|---|
| 2014/0040272 A1 | 2/2014 | Houghton |
| 2014/0046965 A1 | 2/2014 | Tian et al. |
| 2014/0053088 A1 | 2/2014 | Civelli et al. |
| 2014/0082670 A1 | 3/2014 | Papish |
| 2014/0089626 A1 | 3/2014 | Schluessler et al. |
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0152655 A1 | 6/2014 | Johnston et al. |
| 2014/0157210 A1 | 6/2014 | Katz et al. |
| 2014/0164371 A1 | 6/2014 | Tesch et al. |
| 2014/0188889 A1 | 7/2014 | Martens et al. |
| 2014/0188956 A1 | 7/2014 | Subba et al. |
| 2014/0208234 A1 | 7/2014 | Amit et al. |
| 2014/0250147 A1 | 9/2014 | Shapira et al. |
| 2014/0279013 A1 | 9/2014 | Chelly et al. |
| 2014/0282136 A1 | 9/2014 | Marantz et al. |
| 2014/0282660 A1 | 9/2014 | Oztaskent et al. |
| 2014/0294257 A1 | 10/2014 | Tussy |
| 2014/0316890 A1 | 10/2014 | Kagan |
| 2014/0330819 A1 | 11/2014 | Raina et al. |
| 2014/0362108 A1 | 12/2014 | Aguera-Arcas |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0095855 A1 | 4/2015 | Bai et al. |
| 2015/0100524 A1 | 4/2015 | Pantel et al. |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0254057 A1 | 9/2015 | Klein et al. |
| 2015/0317649 A1 | 11/2015 | Joshi et al. |
| 2015/0339405 A1 | 11/2015 | Vora et al. |
| 2016/0055246 A1 | 2/2016 | Marcin et al. |
| 2016/0098640 A1 | 4/2016 | Su |
| 2016/0321052 A1 | 11/2016 | Sharifi et al. |
| 2017/0031575 A1 | 2/2017 | Dotan-Cohen et al. |
| 2017/0039291 A1 | 2/2017 | Singh et al. |
| 2017/0098159 A1 | 4/2017 | Sharifi et al. |
| 2017/0118576 A1 | 4/2017 | Sharifi et al. |
| 2017/0139879 A1 | 5/2017 | Sharifi et al. |
| 2017/0153784 A1 | 6/2017 | Feltham et al. |
| 2017/0192766 A1 | 7/2017 | Sogani et al. |
| 2017/0289292 A1 | 10/2017 | Arning et al. |
| 2018/0173403 A1 | 6/2018 | Carbune et al. |
| 2018/0246978 A1 | 8/2018 | Marcin et al. |

FOREIGN PATENT DOCUMENTS

| | | |
|---|---|---|
| CN | 101587495 | 11/2009 |
| CN | 101763357 | 6/2010 |
| EP | 2306290 | 4/2011 |
| EP | 2466921 | 6/2012 |
| EP | 2728481 | 5/2014 |
| EP | 2824558 | 1/2015 |
| WO | 03088080 | 10/2003 |
| WO | 2009054619 | 4/2009 |
| WO | 2012075315 | 6/2012 |
| WO | 2012135226 | 10/2012 |
| WO | 2013122840 | 8/2013 |
| WO | 2013173940 | 11/2013 |
| WO | 2014105922 | 7/2014 |
| WO | 2014146265 | 9/2014 |
| WO | 2016064857 | 4/2016 |

OTHER PUBLICATIONS

Zhou et al., "Optimizing User Interaction for Web-Based Mobile Tasks", IEEE, Apr. 2010, 4 pages. dated 2010.

Collobert et al., "Natural Language Processing (almost) from Scratch", Journal of Machine Learning Research, vol. 12, Aug. 1, 2011. pp. 2493-2537 dated 2011.

Minkov et al., "Extracting Personal Names from Email: Applying Named Entity Recognition to Informal Text", Proceedings of Human Language Technology Conference and Conference on Empirical Methods in Natural Language Processing, available at https://www.cs.cmu.edu/~rcwang/papers/emnlp-2005.pdf, Oct. 1, 2005, pp. 443-450 dated 2005.

"The new IFTTT is here", IFTTT Blog (https://ifttt.com/blog/2016/11/the-new-ifttt-is-here), printed Nov. 3, 2016, 6 pages. dated 2016.

Adistambha, et al., "Efficient multimedia query-by-content from mobile devices", Computers & Electrical Engineering, vol. 36, No. 4, 2010, pp. 626-642. dated 2010.

Hsu, et al. "Snap2Read: Automatic Magazine Capturing and Analysis for Adaptive Mobile Reading", Lecture Notes in Computer Science, vol. 6524, 2011. 11 pages. dated 2011.

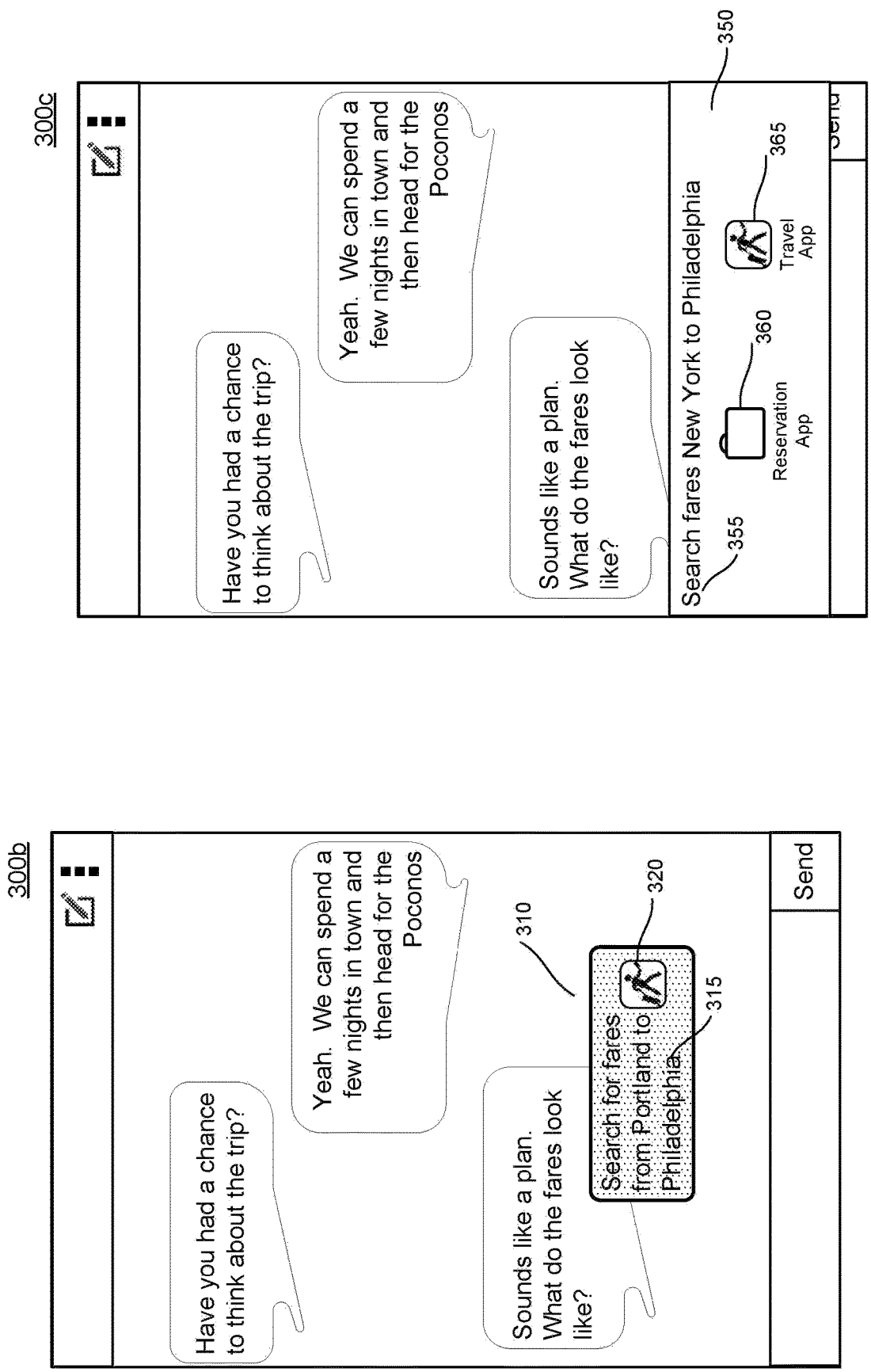

| Semantic Record |
|---|
| Title |
| Subtitle |
| Thumbnail |
| Target |
| Sub-target |
| Sub-target |
| Secondary Target |

FIG. 5

PROVIDING CONTEXTUAL ACTIONS FOR MOBILE ONSCREEN CONTENT

BACKGROUND

Due to the use of mobile devices, such as smart phones, wearable devices, and tablets, user interaction with mobile applications has been increasing. As users move away from web-based browsers to using mobile devices they often lose the ability to easily transfer data from one mobile app to another. In general, mobile applications are single purpose and very good at one specific thing, but moving information between mobile applications can be cumbersome. Providing actions for content displayed on a screen can improve the usability of mobile applications but predicting actions for displayed content is challenging.

SUMMARY

Implementations provide personalized action suggestions in a mobile app environment. Specifically, implementations identify actions potentially helpful to the user in data provided by a third party via an application programming interface (API). Because the data is provided by the third party, it can include information unavailable via screen scraping, which improves the quality of the personalized suggestions. Implementations use the data to determine one or more action predictions, e.g., actions determined to likely be helpful to the user given the data provided, and provide the actions in a semantic record, which includes information that the third party application can use to display in an interface for initiating the actions. The semantic records can include a title, a subtitle, a thumbnail, and a target for each action. In some implementations, secondary targets are also provided in the semantic record as alternatives to the primary target. In some implementations, sub-actions may be provided in the semantic record. The target is a link, such as an intent for a target application or another type of deep link into the target application, that transfers data and control from one mobile application to another or switches data and control to a different user interface within the same application. The third party application may use the semantic record(s) to generate an action suggestion interface in any manner desired. The system may require authentication from the third party as part of the API, and may use the authentication information to select an appropriate prediction model and/or to rank predictions.

According to certain aspects of the disclosure, a system includes at least one processor and memory storing instructions that, when executed by the at least one processor, cause the system to perform operations. The operations may include receiving a request for a suggested action from a third-party, the request including content information and context information, the content information representing information to be displayed on a mobile device as part of a source mobile application operated by the third party and the context information including information specific to the source mobile application not for display on the mobile device. The operations may also include predicting at least one action for the content information based on analysis of the content information in view of the context information, and providing the at least one action with a title and an image to the third-party, the action identifying a target mobile application that differs from the source mobile application.

According to certain aspects of the disclosure, a method includes receiving content information and context information from a source mobile application, the content information representing information to be displayed on a mobile device as part of a source mobile application administered by a third party, the context information being information specific to the third party and unavailable to a screen scraper. The method also includes predicting an action based on the content information and the context information, the action representing a deep link for a target mobile application. The method further includes providing the action to the source mobile application with a title and a thumbnail, the source mobile application using the title and thumbnail to display a selectable control that, when selected, causes the mobile device to initiate the action.

According to certain aspects of the disclosure, a method includes providing content information and context information to an action suggestion application program interface, the content information representing information to be displayed on a mobile device as part of a source mobile application administered by a third party, the context information including information specific to the third party that is not for display on the mobile device. The method may also include receiving at least one semantic record, the semantic record identifying an action predicted using the content information and the context information, the semantic record including a title and a thumbnail for the action. The method may further include initiating display of the title and the thumbnail as a selectable control that is displayed with the content information on the mobile device. The action may be an action that is unavailable to a screen scraper.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for providing personalized assistance actions to a third party mobile application, substantially as shown in and/or described in connection with at least one of the figures, and as set forth more completely in the claims.

One or more of the implementations of the subject matter described herein can be implemented so as to realize one or more of the following advantages. As one example, implementations provide a way for a user to seamlessly transfer information between mobile applications, enabling a user to lookup additional information with minimal effort and usage of system resources. As another example, implementations improve the quality of suggested actions by providing both content and context for analysis, the context including information specific to the third-party application or third-party that is not available via a screen-scraping process. The actions suggested may be customized for the user of the mobile device, making it more likely that the user finds the interface helpful. The suggestions can help the user find/handle information, even though the user may not have knowledge of the application for handling the information. Thus implementations help the user discover more effective or popular tools. It will be appreciated that improved device performance is a facet of implementations. For example, the reduction of user interaction with the device (i.e., fewer inputs from the user) to transfer from a source application to a specific user interface in a target application reduces demands on computation resources, memory usage, and battery usage in a client or mobile device.

The details of one or more implementations are set forth in the accompanying drawings and the description below.

Other features will be apparent from the description and drawings, and from the claims.

BRIEF DESCRIPTION OF DRAWINGS

FIG. 3A, FIG. 3B, and FIG. 3C are example displays of a mobile computing device illustrating another third party application in accordance with the disclosed subject matter.

FIG. 5 illustrates an example semantic record, in accordance with disclosed implementations.

Like reference symbols in the various drawings indicate like elements.

DETAILED DESCRIPTION

Implementations include systems and methods that predict mobile applications for content provided by a third-party mobile application in view of context for the content. The content and context is provided via an API to an action suggestion engine. The content may be a text. The content may also be an image. The context provided by the third-party application is metadata about the content that is not displayed on the screen of the mobile device. Thus, the context is information that is unavailable to a screen-scraper, but is valuable to the action suggestion engine for predicting the best actions. The context information may be considered proprietary to the third-party application or the third-party. The action suggestion engine uses the content information and context information to determine one or more actions that may be most helpful to the user of the mobile application. The action suggestion engine provides information about the one or more actions to the third-party mobile application in a semantic record. The third-party mobile application can use the semantic record decide how to display an interface for initiating the action.

Figure 1:
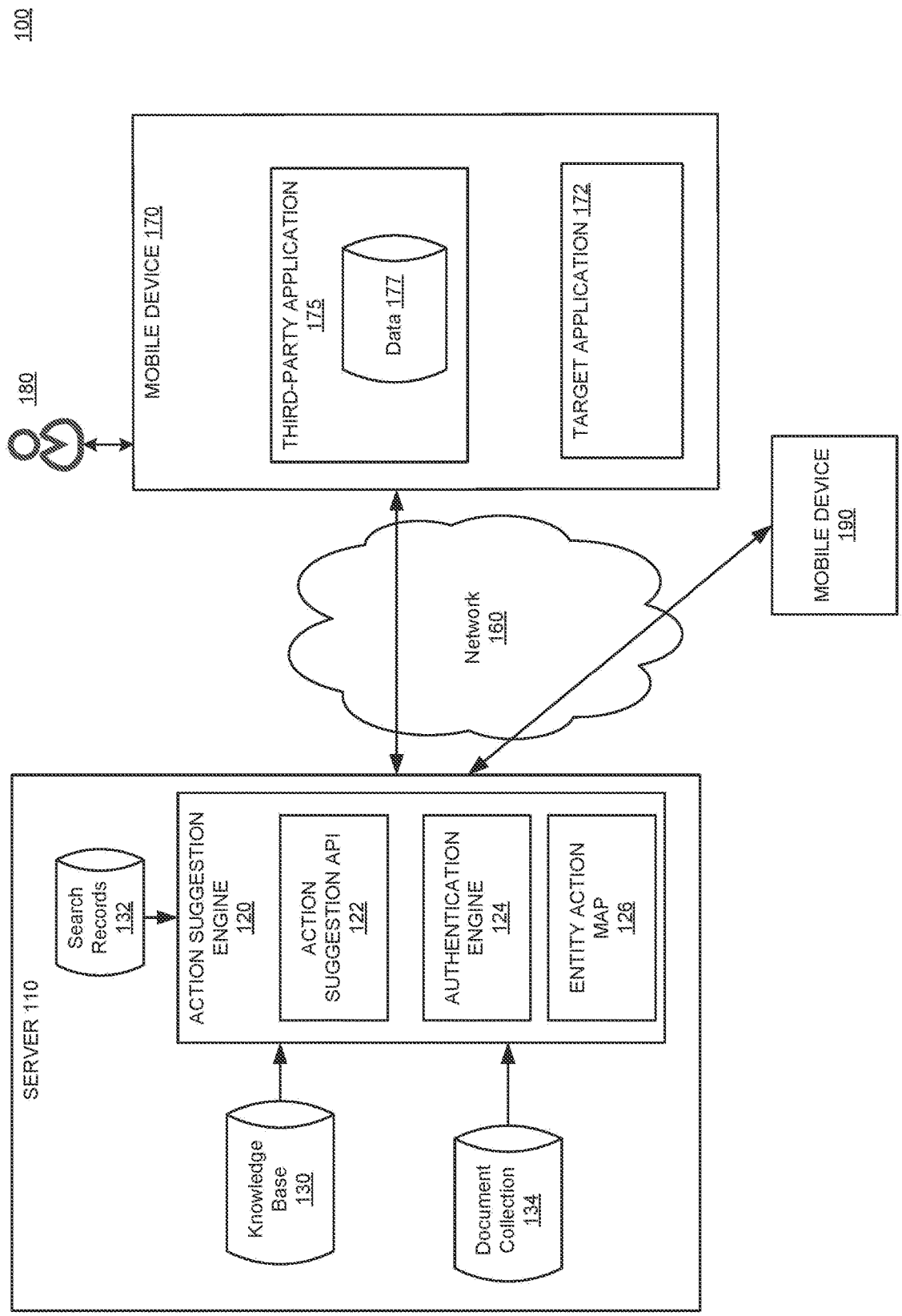
FIG. 1 is a block diagram illustrating an example system in accordance with the disclosed subject matter.

FIG. 1 is a block diagram of a third-party action suggestion system in accordance with an example implementation. The system 100 may be used to provide suggested actions based on content displayed by a third-party mobile application and context for the content. Both the content information and the context information are provided by the third-party application to an action suggestion engine. The action suggestion engine provides information for displaying and triggering one or more suggested actions. The third-party mobile application determines how to display the provided information. The third-party mobile application may use the services of the action suggestion engine through an authorization process used by the action suggestion engine. The actions may represent intents (e.g., standard or nonstandard) for other mobile applications, and can include mobile applications the user has not yet installed on the mobile device. In some implementations, the actions may also launch a web mirror for the mobile application. The depiction of system 100 in FIG. 1 is a client-server system, with some data processing occurring at a server 110. However, other configurations and applications may be used. For example, the data processing may occur exclusively on the mobile device 170. In some implementations, a user of the mobile device 170 may indicate that portions of the processing be performed at the server 110. Thus, implementations are not limited to the exact configurations illustrated.

Figure 6:
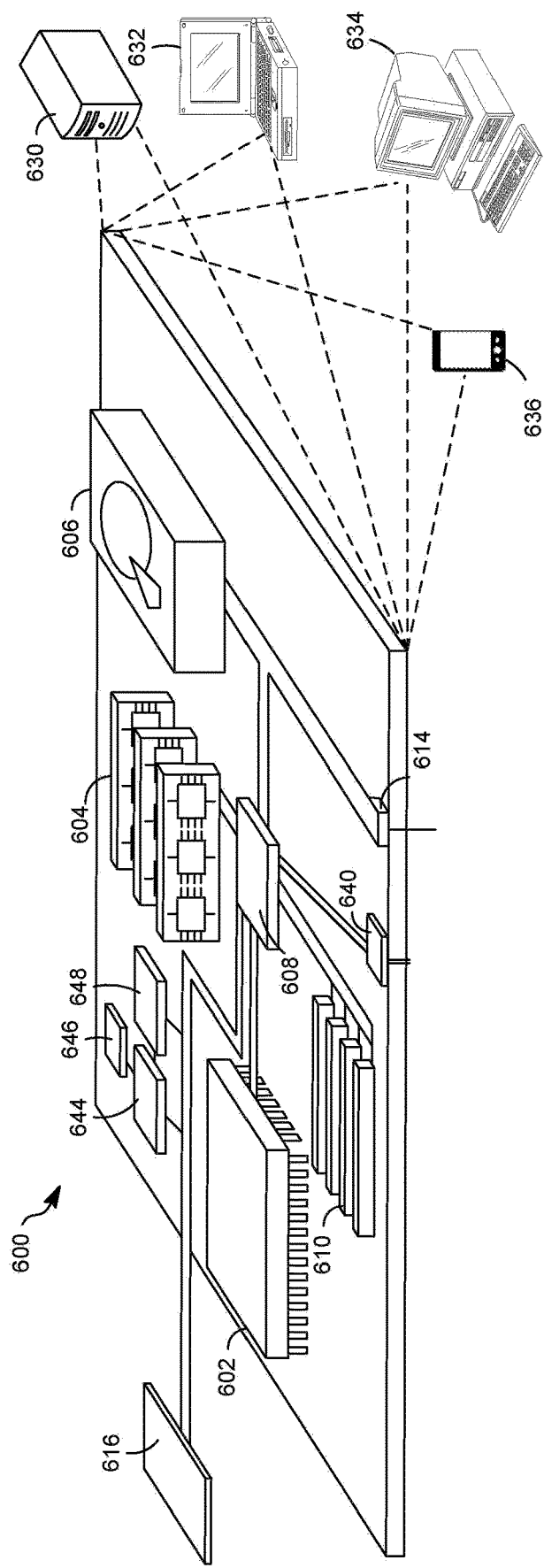
FIG. 6 shows an example of a computer device that can be used to implement the described techniques.
Figure 7:
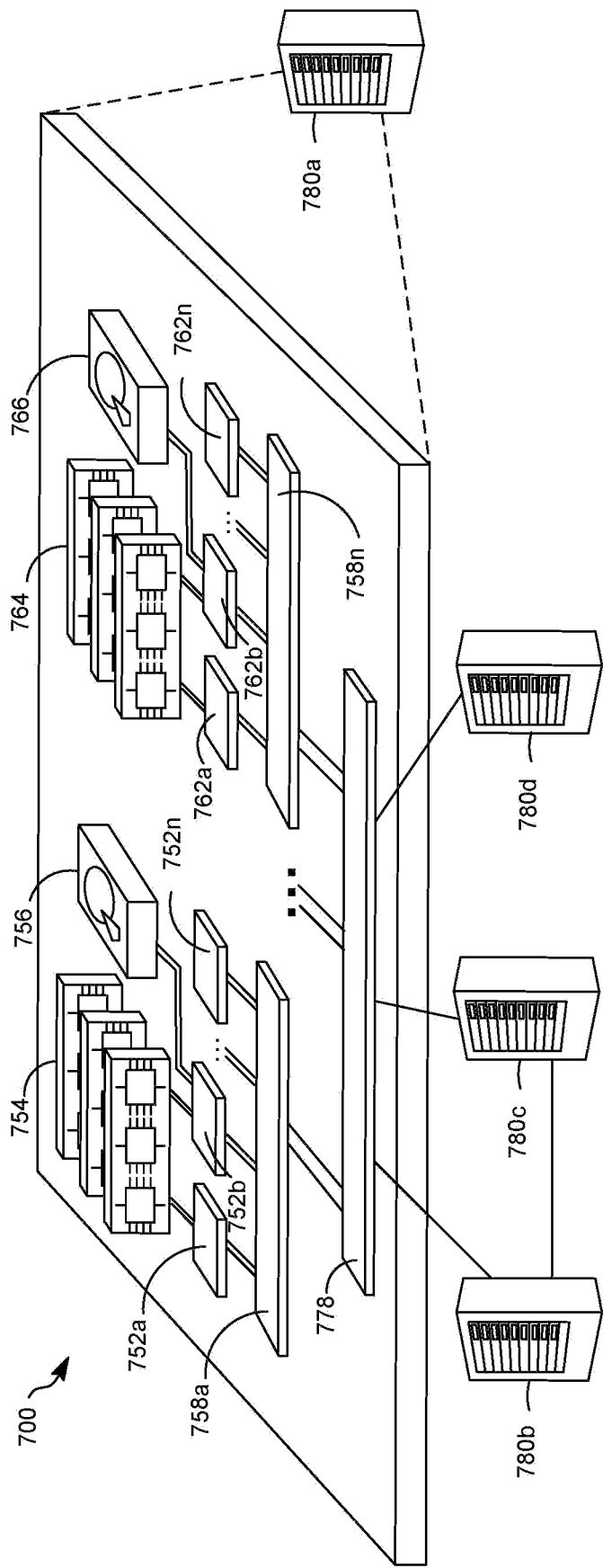
FIG. 7 shows an example of a distributed computer device that can be used to implement the described techniques.

The action suggestion system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 600, as depicted in FIG. 6, or system 700, as depicted in FIG. 7. Server 110 may include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 110.

The modules of the third-party action suggestion system 100 may include an action suggestion engine 120. The action suggestion engine 120 may be configured to generate one or more suggested actions when provided content and context from authorized third-party applications. The authorized third-party applications are also referred to as source applications. In some implementations, the action suggestion engine 120 may be configured to identify entities in the content and the context. Entities may be entities in a knowledge base 130. A single entity in the content may match more than one entity in the knowledge base 130, which means the entity is ambiguous. The context information may provide clues to the correct disambiguation. In some implementations, the knowledge base 130 may be stored on the mobile device 170 and may be a subset of entities and relationships from a larger knowledge base. The entity may be identified in text, e.g., a word that identifies an entity. The entity may also be identified in an image, e.g., a logo or picture that represents the entity. The entity may also be identified by a pronoun that refers to the entity. The entity may also be identified using the context information. Context information includes information specific to or proprietary to the third-party mobile application or the third-party. In other words, the context information includes information that the third-party has access to that is not otherwise accessible, e.g., by the operating system, a screen-scraper, or other mobile applications not administered by the third party.

Context information may be used to disambiguate entity mentions, e.g., when the content matches more than one entity in a knowledge base 130. The context may also be used to provide entities for a complete query. For example, the content, which is to be displayed on the screen, may reference other entities that are needed to complete a question. For example, in a messaging application, one of the users may type "what are the fares?" With context that includes a history of the message stream, the action suggestion engine 120 can determine which cites are the likely destination and end points. These cities are entities needed to form a complete action, e.g., searching for airline fares from city X to city Y. The context may also provide information that enables the action suggestion engine 120 to determine whether "fares" refers to airline, train, bus, or taxi fares. Thus, the context information provided to the action suggestion engine 120 enables the action suggestion engine 120 to provide higher quality suggestions. The action suggestion engine 120 may use known or later-discovered entity resolution techniques to recognize entities in the content provided by the third-party application given the context.

In some implementations, the action suggestion engine may include an entity action map 126. In some implementations, the entity action map 126 may be a trained machine-learning model that converts the content and context to features and predicts one or more actions based on the features. For example, the model may be trained to predict a mobile application given a particular query (e.g., an entity or phrase). The query may be an entity identified in the content. The context may provide additional features for the model to provide a better suggested action. The model may be any type of machine-learning algorithm, such as a long short-term memory (LSTM) neural network, feed-forward neural network, a support vector machine (SVM) classifier, a deep learning network, etc., that can predict one or more actions (e.g., mobile applications) given a query. In some implementations, the model may accept the query character by character and the model may make a prediction only when the end of input character is encountered. In such implementations, the model uses a very small vocabulary making it compact and suitable for storage and execution on a mobile device. In some implementations, the model may include a character embedding layer, two LSTM layers with 64 nodes each, and a softmax classification layer. In some implementations, the model may be trained to take words as input instead of characters. In some implementations, the model may be trained or customized for a particular third-party application. In such implementations, the entity action map 126 may include multiple models and the system may use authentication information to select a corresponding model.

In some implementations, the action suggestion engine 120 may issue a query for entities identified in the screen content and may send the query to a search engine (not shown). The search engine may generate a search result from which the action suggestion engine 120 can generate one or more actions. In some implementations, the entity action map 126 may map entity types to actions. For example, movies may map to a ticket-buying mobile application or to a movie database mobile application, where restaurant entities may be mapped to a reservation application. The entity type may be a property of the entity in the knowledge base 130. In some implementations, the user may set the default mobile application for different types of entities.

In some implementations, the entity action map 126 of the action suggestion engine 120 may include a table that maps entities or entity types to an action (i.e., a deep link) to a mobile application. For example, the entries/entity types in the table may be provided by a developer of the mobile application, by an emulator that discovers the deep link and its associated entity/entity type. Implementations of the action suggestion engine 120 are not limited to these examples, but may include these and/or other methods of determining a suggested action for the content and context provided via an action suggestion application program interface (API) 122.

The action suggestion engine 120 may have access to various data sources that can be used as input into the action suggestion engine 120. For example, the server 110 may include search records 132 and document collection 134. The search records 132 may include search logs, aggregated data gathered from queries, or any other data based on queries. In some implementations, the search records 132 may be generated by a search engine in the normal process of generating search results. In some implementations, the search records 132 may be stored on a different computing device that is accessible to server 110. In some implementations, the search records 132 may be distributed across a plurality of computing devices. The document collection 134 may be documents obtained using known or later developed web-crawling techniques, for example. In some implementations, the document collection 134 represents documents available over the Internet and may be an indexed form of the documents.

As another example, the server 110 may include knowledge base 130. The knowledge base 130 stores information about entities. In some implementations, a knowledge base 130 stores information about entities in the form of relationships between entities. For example, entities in a knowledge base 130 may be related to each other by labeled edges that represent relationships. The knowledge base 130 may also store attributes of an entity. Some knowledge bases are large, sometimes including millions of entities. A knowledge base with a large number of entities and even a limited number of relationships may have billions of connections.

The knowledge base 130 may also include image recognition entities that can be used to identify an entity in an image. For example, the knowledge base 130 may include entities that represent known images of the entity and/or characteristics of the image and are used in image recognition processes (e.g., using image similarity techniques) to identify entities in images. For example, the characteristics may be features provided to an image recognition model (e.g., machine learning algorithm). The knowledge base 130 may represent a single knowledge base, a combination of distinct knowledge bases, image recognition entities, and/or a combination of a knowledge base and image information. In some implementations, knowledge base 130 may be stored in an external storage device accessible to server 110. In some implementations, the knowledge base 130 may be distributed across multiple storage devices and/or multiple computing devices, for example multiple servers. The entities and relationships in the knowledge base 130 may be searchable, e.g., via an index. For example, the index may include text by which an entity has been referred to. Thus, reference to the knowledge base may be understood to include an index that facilitates finding an entity using a text equivalent. The action suggestion engine 120 may use one or more of the knowledge base 130, the search records 132, and the document collection 134 to predict actions given content information and context information.

The action suggestion engine 120 may include the action suggestion API 122, which enables third-party mobile applications to access the action suggestion engine 120. The action suggestion API 122 may take as input content, context, and authorization information from the third-party application, e.g., third-party application 175. The content information includes text or images to be displayed or being displayed on a screen of the mobile device 170. The content information represents data the user is able to view and about which the user has requested assistance and is capable of being detected by a screen-scraper.

The context information represents data that the user is not currently able to view. Context can include historical information kept by the third-party application. For example, in a messaging application the context can include messages previously sent and received between the participants in the chat. As another example, the context can include previous searches performed in the third-party application. Other previously entered or viewed data may be kept by the third-party application in accordance with the terms and conditions set by the third-party and accepted by the user. Context can also include interests known to the third-party application. For example, the user may have a user profile that includes interests either expressly provided by the user or derived from previous user interaction with the third-party application, e.g., based on popular searches or operations performed by the user using the third-party application. Context may also include attributes about how the user uses the third-party application, such as how long the user has been using the application, how long the current session has been in use. Context may also include user preferences, such as language, region, default location, etc. that are set by the user. Context information is thus metadata about the session and may include any information that is not currently visible to the user of the mobile device 170 that the third-party application 175 provides with the content, which is information visible to the user.

The action suggestion API 122 may also include third-party application authentication information. This is data that the third-party application uses to authenticate itself to the action suggestion engine 120. The action suggestion engine 120 may only accept requests from authorized third-party applications. In some implementations, the action suggestion engine 120 can include models (e.g., machine-learning models) customized for the particular third-party application and the authentication information enables the action suggestion engine 120 to select an appropriate model for the third-party application.

The action suggestion engine 120 may include an authentication engine 124. The authentication engine 124 may use the authentication information provided by the third-party application 175 via the action suggestion API 122 to determine whether or not the action suggestion engine 120 should respond to the third-party application 175 request. The authentication engine 124 may use known or later developed authentication techniques to verify whether a particular request made via the action suggestion API 122 is authorized.

When a request is authorized, the action suggestion API 122 returns one or more semantic records to the requesting third-party application 175. A semantic record includes information about an action that the third-party application 175 can choose to display. The semantic record lacks layout information. In some implementations, the semantic record may include a title. The title provides a short text description of the action. The semantic record may also include a subtitle. The subtitle can include properties about an entity that is the subject of the action, e.g., the address of a location, the phone number of a restaurant, birthdates for a person, etc. The subtitle can also include a longer description of the action. The semantic record may also include a thumbnail. The thumbnail is a small image that can be displayed as a selectable control for the action. The semantic record may also include a target for the action. The target may be a deep link into the third-party application or into a target application that differs from the third-party application. A deep link may be similar to parameters that, when provided to a target mobile application, cause the target mobile application to display particular content. In some implementations, the deep link may be an identifier that encodes the application identifier and data used to start the application in a particular state. In some implementations, the deep links may be a list of variable-value pairs (e.g., XML elements) that, when provided to the mobile application, cause the mobile application to display the particular content. In some implementations, the deep link can be a single variable-value pair (e.g., XML element) with a regular expression. Such a deep link may be referred to as a deep link template. In some implementations, the deep link template may also specify or be associated with an entity type. The deep link can also be an intent for the mobile application.

In some implementations, the semantic record may also include one or more secondary targets. The secondary target may be an alternate target that the third-party application can use. For example, a secondary target may take the user to a shopping application to search for an entity. As another example, a secondary target may enable the user to purchase an item that is the subject of the semantic record automatically. As another example, the secondary target may enable a user to save the information from the semantic record for later recall, e.g., to bookmark the information, or to save it as part of a reminder. As another example, the secondary target may enable the user to send information from the semantic record to a clipboard. Such a copy target action may provide text recognized in an image that was provided as part of the content to a clipboard. As another example, a sub-target may enable the user to share the information in the semantic record with another mobile device or another user. In some implementations, the semantic record may also include one or more sub-targets. The sub-target is a target action that is related to but different from the main target action. For example, a sub-target may automatically download the target application associated with the main action. As another example, the sub-target may take the user to a web-mirror for the target in a browser application. Implementations include other possible sub-target actions. The third-party application 175 may decide whether or not to make such sub-actions or secondary targets available to the user. This may be used by the third-party application 175 to suggest the application to the user. The third-party application 175 may use the information provided in the one or more semantic records to decide how to display the action with the content that it generates for display.

In some implementations, the action suggestion engine 120 uses a ranking engine to determine which suggested actions to provide to the third-party application 175 as semantic records. For example, the action suggestion engine 120 may choose a quantity (e.g., 3 or 4) of the top ranking, e.g., most probable or any action with a score higher than a specified threshold, to provide to the third-party application 175. In some implementations, the quantity or threshold may be dependent on metadata about the device, e.g., a lower quantity or higher threshold when the device is moving. In some implementations, the display of the suggested actions may be scrollable, e.g., to allow the user to select from more actions than are initially displayed. In some implementations, the context information may be used to rank predicted actions. In some implementations, all suggested actions may be provided to the third-party application 175 and the third-party application 175 may select which actions from the semantic records to display to the user.

In some implementations, the system may push the action suggestion engine 120 to one or more mobile devices, e.g., mobile device 170 and mobile device 190. In such implementations, the action suggestion engine 120 can be part of the operating system functionality or may be a stand-alone mobile application. Mobile device 170 may be any mobile personal computing device, such as a smartphone or other handheld computing device, a tablet, a wearable computing device, etc., that operates in a closed mobile environment rather than a conventional open web-based environment. The mobile device 170 may also be any personal computing device. Mobile device 170 may be an example of computer device 600, as depicted in FIG. 6. Mobile device 170 may be one mobile device used by user 180. User 180 may also have other mobile devices, such as mobile device 190.

Mobile device 170 may include one or more processors formed in a substrate configured to execute one or more machine executable instructions or pieces of software, firmware, or a combination thereof. The mobile device 170 may thus include one or more computer memories configured to store one or more pieces of data, either temporarily, permanently, semi-permanently, or a combination thereof. The mobile device 170 may include mobile applications, such as third-party application 175 and target application 172, which represent machine executable instructions in the form of software, firmware, or a combination thereof. In some implementations the third-party application 175 and the target application 172 may be mobile applications developed for a mobile processing environment. Conventionally, mobile applications operate in a closed environment, meaning that the user employs separate applications to perform activities usually performed in a web-based browser environment. For example, rather than going to bookit.com to book a hotel, a user of the mobile device 170 can use a mobile application provided by bookit.com. A mobile application may have a web page or pages that mirror the mobile application, e.g., providing the same or similar content as the mobile application. Thus, in some implementations, the web page(s) (e.g., at bookit.com) may be considered a web mirror of the mobile application (e.g., an app provided by or associated with bookit.com). In some implementations, the semantic record for an action may include a link to the web mirror for the mobile application that represents the main action.

The third-party application 175 may include data 177. The data 177 may include historical data about the user's use of the third-party application 175. For example, the data 177 may include a history, such as a chat history, a search history, etc. The data 177 may also include information about usage of the third-party application 175, e.g., the length of a current session, settings the user selected, etc. The data 177 may also include user profile information, which may have been provided directly by the user or inferred by the third-party application 175. The data 177 is collected and stored with user permission in accordance with any user agreement associated with the third-party application 175. Although illustrated as stored on the device 170, in some implementations, the data 177 may be stored at a server, e.g., as part of a user account.

The third-party application 175 may submit requests to the action suggestion engine 120 via the action suggestion API 122. The request can be submitted in response to a specific action by the user. For example, the third-party application 175 may provide a suggestion control, which may be a specific input, a gesture, or action, that triggers the request. As one example, the suggestion control may be a long hold, a swipe left or right, a right-click, a two finger click, or any other input combination determined by the third-party application. The suggestion control can also be a menu option or an icon selected by the user. The menu may appear after some gesture/action performed by the user (e.g., a menu that appears after a swipe up or swipe down). In some implementations, the suggestion control may include dragging a control to the screen, or a portion of the screen to be selected. In some implementations, the suggestion control may be voice activated. For example, the user may speak a command to initiate sending the request to the API 122. The suggestion control may also include enabling the user to make a selection of content on the screen as part of the gesture/action.

In response to selection/actuation/activation of the suggestion control, the third-party application 175 may generate an API request for the action suggestion engine 120. The request includes content data, i.e., the data the third-party application 175 will display to the user as part of a current screen. If a selection of part of the content is made via the selection control, the third-party application 175 may provide the selection as content or context with the API request. The request also includes context information, which includes any metadata the third-party application 175 has that may provide context for the content. The context information is used to disambiguate entities in the content and determine entities missing from the content but needed to complete a request. The context information can be obtained from data 177. The context information can also be obtained from the device 170, e.g., the current time, the current location, acceleration of the device, etc. In some implementations, the data 177 or another data store on the mobile device 170 may include an action suggestion model pushed to the mobile device 170 from the server 110.

The mobile device 170 may be in communication with the server 110 and with other mobile devices 190 over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 110 may communicate with and transmit data to/from mobile devices 170 and 190, and mobile device 170 may communicate with other mobile devices 190 (not shown).

The action suggestion system 100 represents one example configuration and implementations may incorporate other configurations. For example, one or more of the components of the action suggestion engine 120 may be performed at the mobile device 170, while one or more of the components of the third-party application 175 may be performed at a server. As another example one or more of the data stores, such as knowledge base 130, document collection 134, and search records 132, may be distributed across multiple computing devices, or may be stored as a partial copy at the mobile device 170. Likewise, the data 177 may be stored at a server or another location specified by the user. One or more of these data stores may be associated with a user account or profile. In addition, the data stores, e.g., data 177 may be copies of or subsets of data stored on a server.

To the extent that the action suggestion system 100 collects and stores user-specific data or may make use of personal information, the users may be provided with an opportunity to control whether programs or features collect the user information (e.g., information about a user's social network, social actions or activities, a user's preferences, or a user's current location), or to control whether and/or how to receive content that may be more relevant to the user. In addition, certain data may be treated in one or more ways before it is stored or used, so that personally identifiable information is removed. For example, search records may be treated so that no personally identifiable information can be determined and/or a user's geographic location may be generalized where location information is obtained (such as to a city, ZIP code, or state level), so that a particular location of a user cannot be determined. Thus, the user may have control over how information is collected about the user and used by an action suggestion system 100.

Figure 2B:
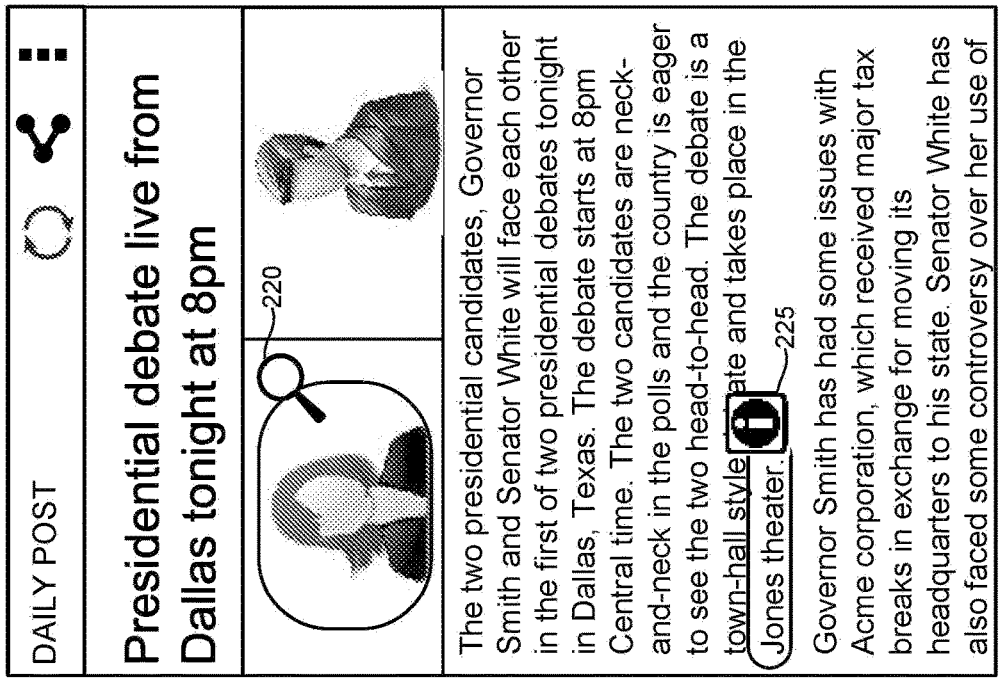
FIG. 2A, FIG. 2B, and FIG. 2C are example displays of a mobile device illustrating an example third party application in accordance with the disclosed subject matter.
Figure 2A:
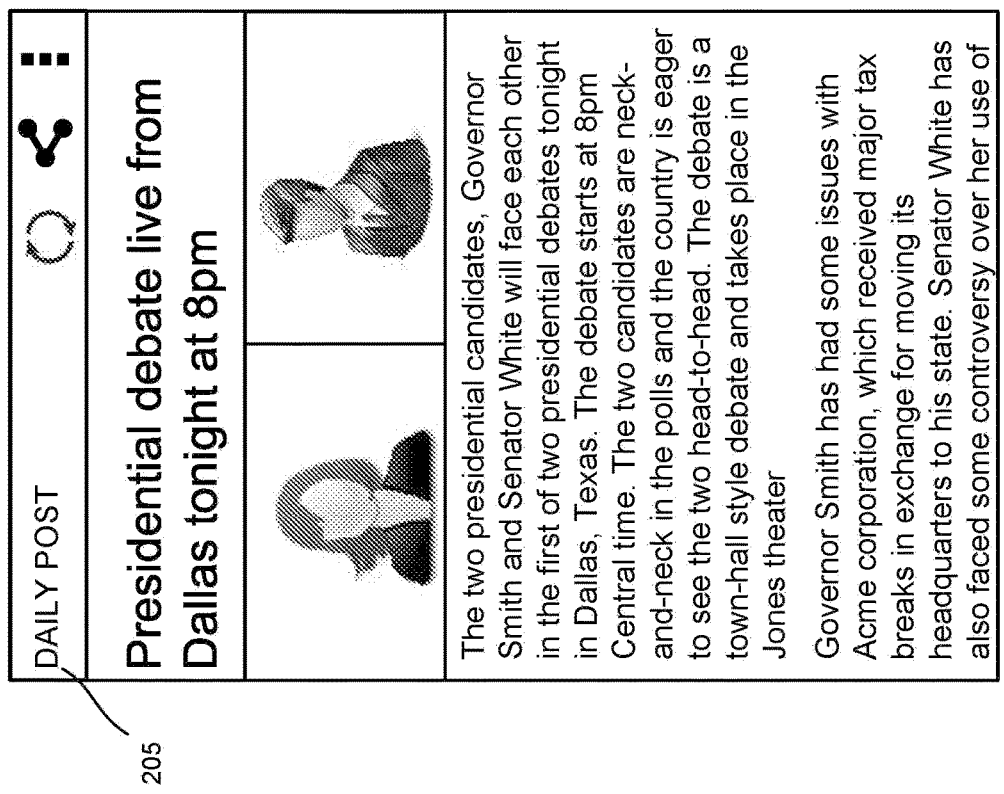
Figure 2C:
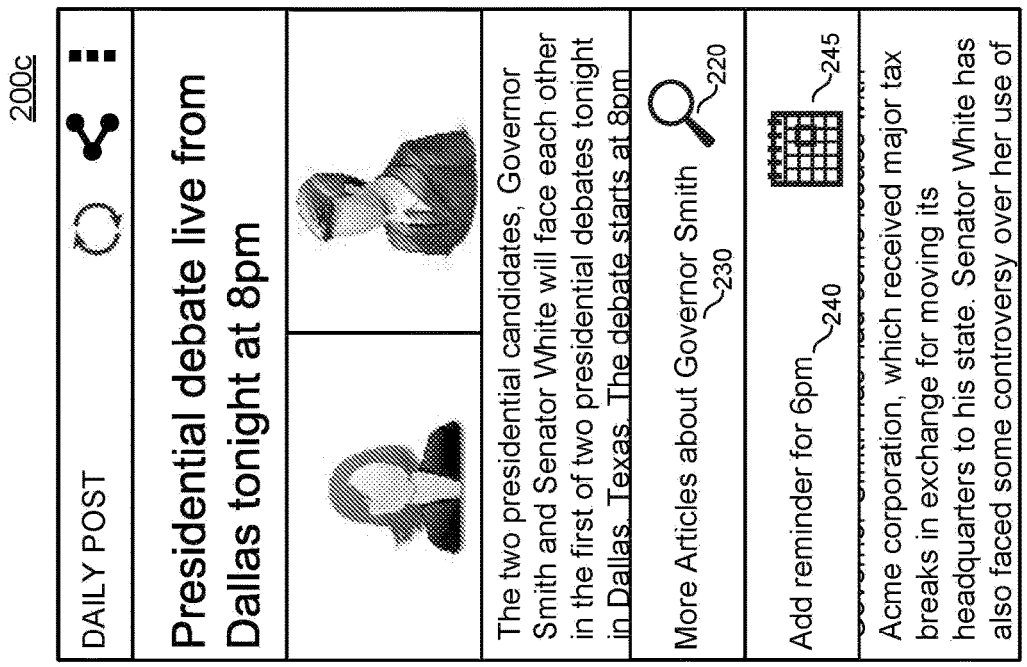

FIGS. 2A, 2B, and 2C are example displays of a mobile device illustrating an example third party application in accordance with the disclosed subject matter. The display 200a may be a display of a mobile device, such as mobile device 170 of FIG. 1. In the example of FIG. 2A, the third-party application 205 is a news-feed application provided by the Daily Post. The third-party application 205 may provide a suggestion control that enables the user to request an interface having suggested actions for the displayed content. In some implementations (not shown), the control may enable the user to select specific content in the display 200a. Any selected content may be the focus of suggested actions. After the user actuation/selection of the suggestion control, the third-party application 205 provides the content of display 200a, along with context information and may provide authentication information to an API of an action suggestion engine, such as action suggestion engine 120 of FIG. 1. The action suggestion engine provides one or more suggested actions to the third-party application 205 via semantic records via the API. The semantic records include data from which the third-party application 205 can generate a user interface that displays one or more of the suggested actions and enables a user to select an action, which will initiate the action in a target application.

FIG. 2B illustrates an example display 200b where the third-party application 205 provides a thumbnail and an indication of the content that is the subject of an action. In the example display of 200b, two actions are displayed, one corresponding to thumbnail 220 and one to thumbnail 225. The thumbnails 220 and 225 are included in the semantic records provided to the third-party application. The third-party application may also have a title and, optionally, a subtitle from the semantic record that corresponds with the respective thumbnail. Thus, for example, if the user performs a first action (e.g., a short press) on the thumbnail 220, the third-party application may display the title or subtitle. A second action (e.g., a double press) may cause the third-party application to perform the action associated with the thumbnail 220. The action may be a deep link into another third-party application or a deep-link into another user interface in the same third-party application. For example, the target action associated with thumbnail 220 may be a search of other news items related to Senator White. The thumbnail 220 may be located near an entity mention of Senator White, e.g., the photo of the Senator. The third-party application can determine where to place the thumbnail 220 based on the title, the subtitle, the action, or a combination of these.

The target action associated with thumbnail 225 may be a deep link into a wiki mobile application that includes more information on the Jones theater, a deep link into a browser application for the home page of the Jones theater, or a deep link into a mobile application that lists current or future scheduled events at the Jones Theater. The title or subtitle may include common details about the theater, such as the address and/or phone number. These details may be displayed when the user performs the first action on the thumbnail 225. The thumbnail 225 may be placed next to content that represents the subject of the associated action. The specific actions illustrated in FIG. 2B are selected based on the context information provided by the third-party application 205 in addition to the content illustrated in display 200a. For example, the third-party application 205 may include a topical interest for the user, which indicates the user has been interested in news items about Senator White in the past. This enables the action suggestion engine to select an action related to Senator White over an action related to Governor Smith. In addition, the third-party application 205 may provide the location of the user as Dallas, Texas.

FIG. 2C illustrates another example display 200c where the third-party application 205 provides an interface having action cards based on semantic records provided by the action suggestion API. In the example display of 200c, the action cards include the thumbnails 220 and 245. Thumbnail 220 is illustrated with title 230 and thumbnail 245 is illustrated with title 240. Each action card may be selectable, e.g., may initiate the target action associated with the card when the user selects the card. The card associated with thumbnail 220 may, for this user, initiate an action that is a deep link into a different user interface within the third-party application 205. For example, the action may represent a search interface with other news items related to Governor Smith. This action is selected based on context provided by the third-party application for this user, for example the number of other news articles the user has looked at in the current session that also reference Governor Smith. The target action associated with thumbnail 245 may be a deep link into a calendar mobile application that adds a calendar item for 6 pm. This action may also have been selected based on context provided by the third-party application 205, e.g., because the user lives in the Pacific time zone and not the Central time zone.

Figure 3A:
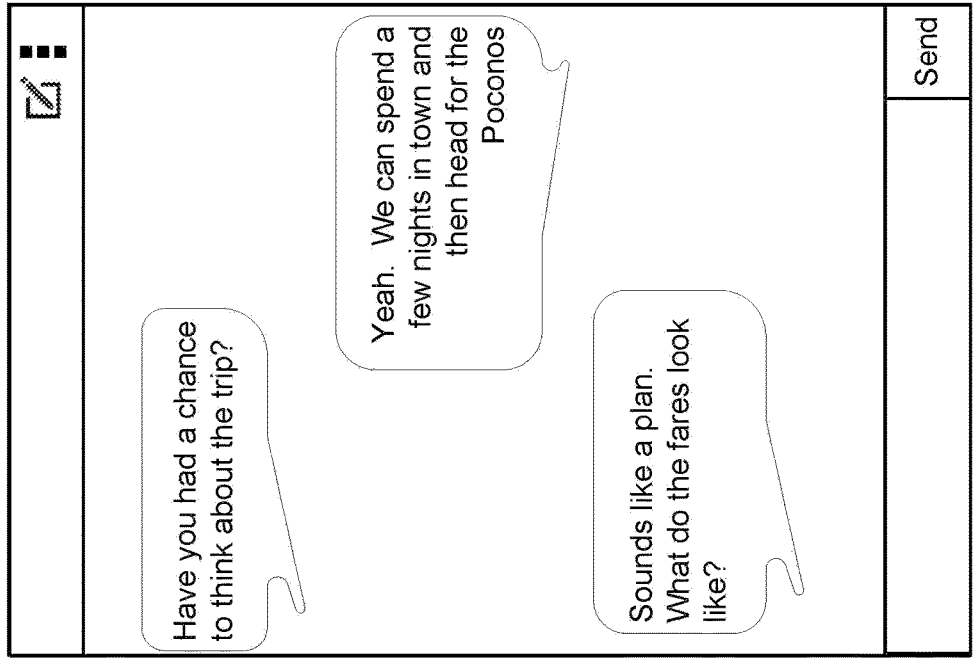

FIGS. 3A, 3B, and 3C are example displays of a mobile computing device illustrating another third party application in accordance with the disclosed subject matter. The display 300a may be a display of a mobile device, such as mobile device 170 of FIG. 1. In the example of FIG. 3A, the third-party application is a messaging application. The messaging application may have access to a messaging history for the user. This messaging history, when provided by the third-party application via the API interface to an action suggestion engine, provides context that can be used to predict more helpful actions for the user. FIG. 3B illustrates an example display 300b with a suggested action control 310. The user of the mobile device has selected or actuated a suggestion control provided by the messaging application, which caused the messaging application to send the content of display 300a and context, including a messaging history for the user, to an action suggestion engine via an API provided by the action suggestion engine. The action suggestion engine provided at least one semantic record in response, which enabled the messaging application to generate the action control 310. The action control 310 includes title 315 and thumbnail 320, which are provided in the semantic record for the action. The action may represent a deep link into a travel mobile application that lists airline fares from Portland Oregon to Philadelphia Pennsylvania. The context provided by the messaging application may enable the action suggestion engine to determine the starting and ending points for a fare search. For example, the messaging history may indicate that this message stream includes previous message content that indicates one of the participants lives in Portland. Alternatively, the messaging application may send a user location that indicates the user is currently in Portland. The context may also provide the basis for searching airline fares, rather than train or taxi fares. This context is unavailable to a screen-scraper.

FIG. 3C illustrates another example display 300c with a suggested action control 350 with a title 355 a thumbnail 360 that corresponds to a primary action and a second thumbnail 365 that corresponds to a secondary action. The secondary action may be an alternative to the primary action. As one example, the messaging application may choose to display the travel application thumbnail 365 because the user does not have the reservation application installed. The secondary action and its thumbnail can be provided as part of the semantic record. If the reservation application is not installed, the third-party application may substitute a sub-target that is provided in the semantic record for the target action that corresponds to the thumbnail 360. The sub-target may be a link (e.g., a deep link/intent) for a web store that enables the user to download and install the reservation application. Thus the messaging application can determine whether to initiate a target action or a sub-target action provided in the semantic record when the user selects the thumbnail or the title or another control associated with the semantic record. The semantic records also enable the messaging application to determine how to display the control, title, thumbnail, and any other information provided in the semantic record.

Figure 4:
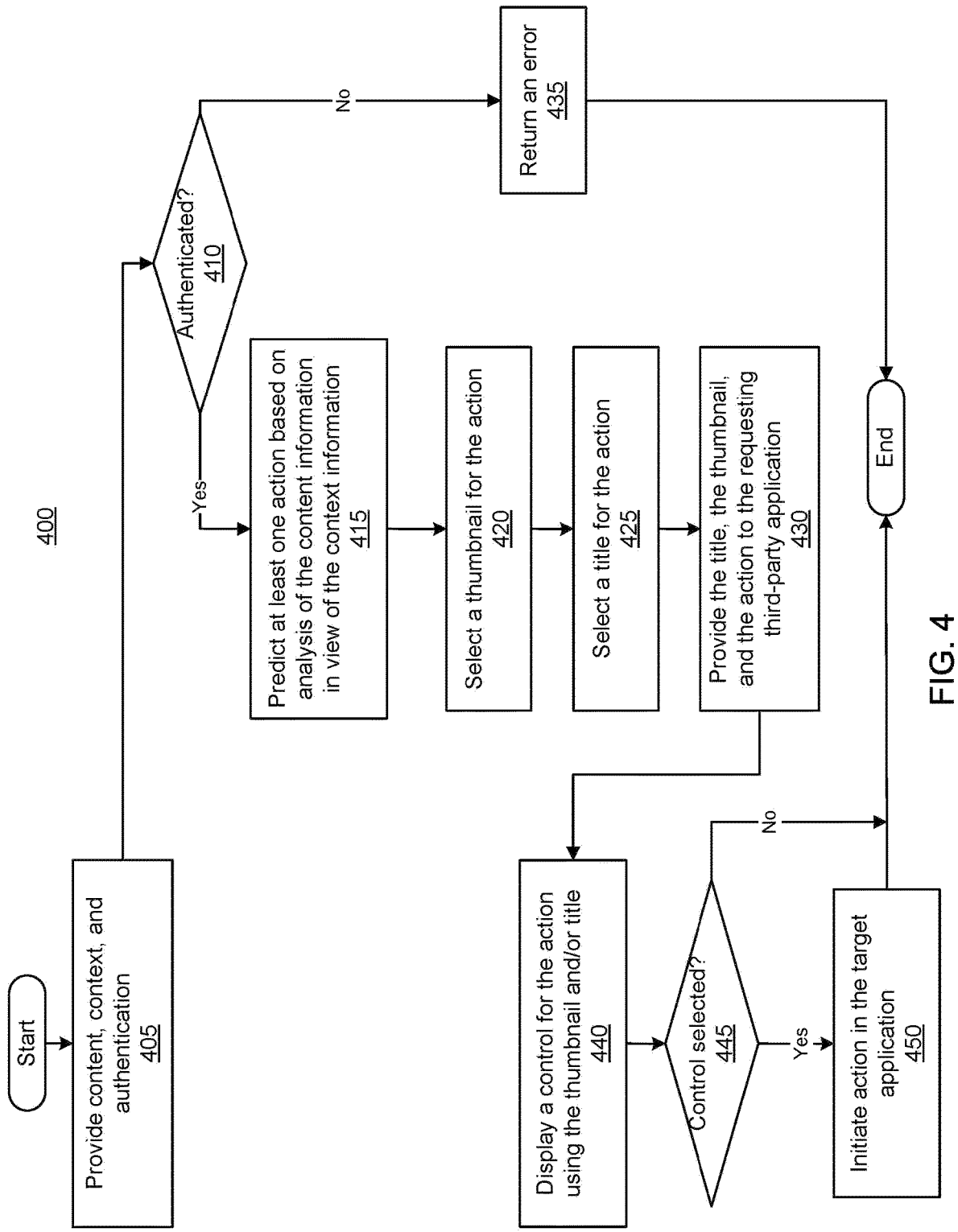
FIG. 4 illustrates a flow diagram of an example process for suggesting actions based on content and context from a third party application, in accordance with disclosed implementations.

FIG. 4 illustrates a flow diagram of an example process 400 for suggesting actions based on content and context from a third party application, in accordance with disclosed implementations. Process 400 may be performed by an action suggestion system, such as system 100 of FIG. 1. Process 400 may be used to determine suggested actions based on content and context provided by a third-party application. Process 400 may begin when the third-party application provides content, context, and authentication information to an action suggestion engine (405). The content represents elements currently displayed or that will be displayed to the user, e.g., the text and images of displays 200a or 300a. The context represents information not currently available for display to the user. Such context can include information in a user profile, information in a user history, device information, etc. that the third-party application has access to. The context information can be proprietary to the third-party or the third-party application. The context can also include a selection of content made by the user as part of initiating process 400, e.g., a selection of text or an image. The authentication information includes data that enables the action suggestion engine to determine whether the third-party application is authorized to use the services of the action suggestion engine. In some implementations, the authentication data may identify the third-party application so the action suggestion engine can select and use an appropriate model for the action suggestion. For example, the action suggestion engine can include multiple models for predicting actions depending on features provided, and the features may be customized to a particular third-party application. The content data, the context data, and the authentication data may be provided by the third-party application via an API.

The system may determine whether the third-party is authenticated based on the authentication data provided (410). In other words, the system may verify the authentication data to determine whether the request by the third-party is valid. If the authentication data is not valid the third-party application is not authenticated (410, No), and the system may return an error (435) to the third-party application and process 400 ends. Otherwise (410, Yes), the system may predict at least one action based on analysis of the content data in view of the context data (415). This may be done in several ways, as explained above with regard to FIG. 1. The action represents an intent or other deep link for a target mobile application. The target mobile application can be the same third-party application that made the request. In other words, the action may be a deep link into another user interface or display within the same third-party application. Such a deep link reduces the use of system resources by reducing the user input needed to arrive at the user interface represented by the target.

The system may select a thumbnail for the action (420). If multiple actions are predicted, the system may select a respective thumbnail for each action. In implementations that provide a secondary action, the system may select a thumbnail for the secondary action. The thumbnail may be an icon associated with a mobile application that is the target of the action or may be another icon that represents the action, e.g., a magnifying glass for a search intent within the third-party application. The system may select a title for the action (425). The title may be a short description of the action or of an entity that is the subject of the action. The subtitle may include a longer description about the action, additional details about the subject entity, a description of the application, etc. In addition, the system may select one or more sub-targets for the action. A sub-target is an alternative action, such as a web-mirror or other web-friendly URL that the user can open in a browser when the user does not have the application installed. The system may provide the title, the thumbnail, and the action via a semantic record to the third-party application. The format of the semantic record is defined by the API. The semantic record can also include additional fields, such as the sub-target, a secondary action and secondary thumbnail, content related to the semantic record, etc. In some implementations, the system may predict several actions for the content and the system may use the context information to rank the actions. For example, the system may recognize the word 'blackbird' in the content. The system may identify two actions for the content; playing a song titled 'blackbird' and opening a knowledge-application (e.g., a wiki, encyclopedia, or knowledge base UI) about blackbirds. The system may use context information to determine which of the two actions to provide, or to provide both but in a ranked order. For example, the context may include an interest in ornithology, which would result in the system ranking the knowledge-application action higher than the song action. On the other hand, the context may include a mention of Paul Mccartney, which would result in the system ranking the song action higher. In some implementations, both actions may have a probability score that meet a threshold and both actions may be provided in the semantic record. Thus, the context information can be used to both determine actions and to rank actions. FIG. 5 is one example of a format for a semantic record.

The third-party application receives the semantic records for one or more suggested actions. In some implementations, the third-party application may include operations that rank or select from among several actions, or among primary and secondary actions. The third-party application generates an interface that includes a control for at least one action (440). The control may include the thumbnail, the title, or both, from the semantic record for the action. The control is selectable and, when selected (445, Yes), causes the third-party application to initiate the deep link for the target application (450). In some implementations, process 400 may include a feedback loop. In the feedback loop, the third-party application provides data to the action suggestion engine identify which actions the user selected and which the user cancelled. Such feedback may be used by the action suggestion engine to improve future predictions, e.g., by generating or adjusting positive or negative training examples. Process 400 then ends.

It is noted here, yet also applicable to variations of the embodiments described herein, that capabilities may be provided to determine whether provision of actions is consistent with rights of use of content, layout, functionality or other aspects of the image being displayed on the device screen, and set capabilities accordingly. For example, settings may be provided that limit content or selection where doing so could be in contravention of terms of service, content license, or other limitations on use. Such settings may be manually or automatically made, such as by a user when establishing a new service or device use permissions, or by an app installation routine or the like.

FIG. 6 shows an example of a generic computer device 600, which may be operated as server 110, and/or client 150 of FIG. 1, which may be used with the techniques described here. Computing device 600 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a computing device, such as a laptop computer 632, personal computer 634, or tablet/smart phone 636. An entire system may be made up of multiple computing devices 600 communicating with each other. Other configurations are possible.

FIG. 7 shows an example of a generic computer device 700, which may be server 110 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 780.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 780 may include other components not shown, such as controllers, buses, input/output devices, communications modules, etc.

An entire system, such as system 100, may be made up of multiple computing devices 780 communicating with each other. For example, device 780a may communicate with devices 780b, 780c, and 780d, and these may collectively be known as system 100. As another example, system 100 of FIG. 1 may include one or more computing devices 780. Some of the computing devices may be located geographically close to each other, and others may be located geographically distant. The layout of system 700 is an example only and the system may take on other layouts or configurations.

According to certain aspects of the disclosure, a method may include receiving a request for a suggested action from a third-party, the request including content information and context information, the content information representing information to be displayed on a mobile device as part of a source mobile application operated by the third party and the context information including information specific to the source mobile application not for display on the mobile device. The method may also include predicting at least one action for the content information based on analysis of the content information in view of the context information, and providing the at least one action with a title and an image to the third-party, the action identifying a target mobile application that differs from the source mobile application.

This and other aspects can include one or more of the following features. For example, context information can include historical information for the mobile application, location information, and/or user interests. As another example, the request may include authentication information and the method may include using the authentication information to verify the third-party prior to predicting the at least one action. As another example, the action may be an intent for the target application and/or a deep link into the target application. As another example, the system may provide sub-actions based on the content information and context information.

According to certain aspects, a method includes receiving content information and context information from a source mobile application, the content information representing information to be displayed on a mobile device as part of a source mobile application administered by a third party, the context information being information specific to the third party and unavailable to a screen scraper. The method also includes predicting an action based on the content information and the context information, the action representing a deep link for a target mobile application. The method further includes providing the action to the source mobile application with a title and a thumbnail, the source mobile application using the title and thumbnail to display a selectable control that, when selected, causes the mobile device to initiate the action.

This and other aspects can include one or more of the following features. For example, the source mobile application may provide authentication information with the content information and the context information and the method may also include determining that the source mobile application is authenticated based on the authentication information and performing the predicting and providing responsive to the determining. In some implementations, the method may also include using the authentication information to select a model that is used in the predicting. As another example, the method may also include providing a sub-action with the action, the sub-action representing a deep link for downloading and installing the target mobile application. As another example, the context information may include information proprietary to the source mobile application, a user history stored by the third party and/or session information for the source mobile application. As another example, the method may also include using the context information to rank the action and a second predicted action, the second predicted action also being based on the content information and the context information.

According to certain aspects, a method includes providing content information and context information to an action suggestion application program interface, the content information representing information to be displayed on a mobile device as part of a source mobile application administered by a third party, the context information including information specific to the third party that is not for display on the mobile device. The method may also include receiving at least one semantic record, the semantic record identifying an action predicted using the content information and the context information, the semantic record including a title and a thumbnail for the action. The method may further include initiating display of the title and the thumbnail as a selectable control that is displayed with the content information on the mobile device. The action may be an action that is unavailable to a screen scraper.

These and other aspects can include one or more of the following features. For example, the method may also include providing authentication information with the content information, wherein receiving the semantic record is dependent on verifying the authentication information. The action may be predicted using a model selected based on the authentication information. As another example, the method may also include receiving selection of the selectable control and initiating the action, including transferring focus to a target application associated with the action.

According to certain aspects, a computing device includes a display device at least one processor, and memory storing instructions that, when executed by the at least one processor, cause the computing device to perform any of the methods described above.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method implemented by one or more processors, the method comprising:
transmitting, via an application programming interface (API) and to an action suggestion engine, and during a current session in which a user is interacting with a third-party application that is administered by a third-party via a client device, context information that reflects user interactions with the third-party application,
wherein the context information is not visible on a current screen of the client device during the current session, and wherein the user interactions with the third-party application include one or more of: current user interactions with the third-party application during the current session, or historical user interactions with the third-party application prior to the current session, and
wherein transmitting the context information that reflects user interactions with the third-party application via the API and to the action suggestion engine causes the action suggestion engine to:
predict, based on the context information, an action to be performed using an additional third-party application that is administered by an additional third-party,
wherein the additional third-party that administers the additional third-party application differs from the third-party that administers the third-party application; and
cause an indication of the predicted action to be performed using the additional third-party application to be provided for presentation to the user during the current session in which the user is interacting with the third-party application;
receiving, via the API and from the action suggestion engine, and based on user input being received that is directed to the predicted action to be performed using the additional third-party application, an indication to transfer focus from the third-party application to the additional third-party application;
in response to receiving the indication to transfer focus from the third-party application to the additional third-party application:
transmitting, via the API and to the additional third-party application, data derived from the user interactions with the third-party application to the additional third-party application,
wherein the data derived from the user interactions with the third-party application to the additional third-party application includes: (i) an intent that is indicative of the predicted action to be performed using the additional third-party application, and (ii) one or more values for one or more corresponding parameters associated with the intent that is indicative of the predicted action to be performed using the additional third-party application.

2. The method of claim 1, wherein the third-party application utilizes the indication of the predicted action to be performed using the additional third-party application to generate an action suggestion interface that includes the predicted action to be performed using the additional third-party application, and wherein the third-party application causes the action suggestion interface to be provided for presentation to the user during the current session in which the user is interacting with the third-party application.

3. The method of claim 2, wherein the third-party application receives the user input that is directed to the predicted action to be performed using the additional third-party application via the action suggestion interface.

4. The method of claim 1, wherein the action suggestion engine causes the indication of the predicted action to be performed using the additional third-party application to be provided for presentation to the user during the current session in which the user is interacting with the third-party application.

5. The method of claim 4, wherein the action suggestion engine receives the user input that is directed to the predicted action to be performed using the additional third-party application.

6. The method of claim 1, wherein the indication of the predicted action to be performed using the additional third-party application includes one or more of: a title of the additional third-party application, a thumbnail for the additional third-party application, or a deep link for the additional third-party application.

7. The method of claim 1, wherein transmitting the data derived from the user interactions with the third-party application to the additional third-party application causes the additional third-party application to utilize the intent that is indicative of the predicted action to be performed the one or more values for the one or more corresponding parameters associated with the intent that is indicative of the predicted action to cause the predicted action to be performed.

8. The method of claim 1, wherein the indication of the predicted action to be performed using the additional third-party application includes one or more of: a title of the additional third-party application, a thumbnail for the additional third-party application, or a deep link for the additional third-party application.

9. A client device comprising:
one or more processors; and
memory storing instructions that, when executed by the one or more processors, cause the one or more processors to:
  transmit, via an application programming interface (API) and to an action suggestion engine, and during a current session in which a user is interacting with a third-party application that is administered by a third-party via a client device, context information that reflects user interactions with the third-party application,
    wherein the context information is not visible on a current screen of the client device during the current session, and wherein the user interactions with the third-party application include one or more of: current user interactions with the third-party application during the current session, or historical user interactions with the third-party application prior to the current session, and
    wherein the instructions to transmit the context information that reflects user interactions with the third-party application via the API and to the action suggestion engine comprise instructions to cause the action suggestion engine to:
      predict, based on the context information, an action to be performed using an additional third-party application that is administered by an additional third-party,
        wherein the additional third-party that administers the additional third-party application differs from the third-party that administers the third-party application; and
      cause an indication of the predicted action to be performed using the additional third-party application to be provided for presentation to the user during the current session in which the user is interacting with the third-party application;
  receive, via the API and from the action suggestion engine, and based on user input being received that is directed to the predicted action to be performed using the additional third-party application, an indication to transfer focus from the third-party application to the additional third-party application;
  in response to receiving the indication to transfer focus from the third-party application to the additional third-party application:
    transmit, via the API and to the additional third-party application, data derived from the user interactions with the third-party application to the additional third-party application,
      wherein the data derived from the user interactions with the third-party application to the additional third-party application includes: (i) an intent that is indicative of the predicted action to be performed using the additional third-party application, and (ii) one or more values for one or more corresponding parameters associated with the intent that is indicative of the predicted action to be performed using the additional third-party application.

10. The client device of claim 9, wherein the instructions further cause the third-party application to utilize the indication of the predicted action to be performed using the additional third-party application to generate an action suggestion interface that includes the predicted action to be performed using the additional third-party application, and wherein the instructions further cause the third-party application to cause the action suggestion interface to be provided for presentation to the user during the current session in which the user is interacting with the third-party application.

11. The client device of claim 10, wherein the instructions further cause the third-party application to third-party application receive the user input that is directed to the predicted action to be performed using the additional third-party application via the action suggestion interface.

12. The client device of claim 9, wherein the instructions further cause the action suggestion engine to cause the indication of the predicted action to be performed using the additional third-party application to be provided for presentation to the user during the current session in which the user is interacting with the third-party application.

13. The client device of claim 12, wherein the instructions further cause the action suggestion engine to receive the user input that is directed to the predicted action to be performed using the additional third-party application.

14. The client device of claim 9, wherein the instructions to transmit the data derived from the user interactions with the third-party application to the additional third-party application further comprise instructions to cause the additional third-party application to utilize the intent that is indicative of the predicted action to be performed the one or more values for the one or more corresponding parameters associated with the intent that is indicative of the predicted action to cause the predicted action to be performed.

15. A non-transitory computer-readable storage medium storing instructions that, when executed by one or more processors, cause the one or more processors to perform operations, the operations comprising:
  transmitting, via an application programming interface (API) and to an action suggestion engine, and during a current session in which a user is interacting with a third-party application that is administered by a third-party via a client device, context information that reflects user interactions with the third-party application,
    wherein the context information is not visible on a current screen of the client device during the current session, and wherein the user interactions with the third-party application include one or more of: current user interactions with the third-party application during the current session, or historical user interactions with the third-party application prior to the current session, and
    wherein transmitting the context information that reflects user interactions with the third-party application via the API and to the action suggestion engine causes the action suggestion engine to:

predict, based on the context information, an action to be performed using an additional third-party application that is administered by an additional third-party,
  wherein the additional third-party that administers the additional third-party application differs from the third-party that administers the third-party application; and
cause an indication of the predicted action to be performed using the additional third-party application to be provided for presentation to the user during the current session in which the user is interacting with the third-party application;
receiving, via the API and from the action suggestion engine, and based on user input being received that is directed to the predicted action to be performed using the additional third-party application, an indication to transfer focus from the third-party application to the additional third-party application;
in response to receiving the indication to transfer focus from the third-party application to the additional third-party application:
  transmitting, via the API and to the additional third-party application, data derived from the user interactions with the third-party application to the additional third-party application,
    wherein the data derived from the user interactions with the third-party application to the additional third-party application includes: (i) an intent that is indicative of the predicted action to be performed using the additional third-party application, and (ii) one or more values for one or more corresponding parameters associated with the intent that is indicative of the predicted action to be performed using the additional third-party application.

16. The non-transitory computer-readable storage medium of claim 15, wherein the third-party application utilizes the indication of the predicted action to be performed using the additional third-party application to generate an action suggestion interface that includes the predicted action to be performed using the additional third-party application, and wherein the third-party application causes the action suggestion interface to be provided for presentation to the user during the current session in which the user is interacting with the third-party application.

17. The non-transitory computer-readable storage medium of claim 16, wherein the third-party application receives the user input that is directed to the predicted action to be performed using the additional third-party application via the action suggestion interface.

18. The non-transitory computer-readable storage medium of claim 15, wherein the action suggestion engine causes the indication of the predicted action to be performed using the additional third-party application to be provided for presentation to the user during the current session in which the user is interacting with the third-party application.

19. The non-transitory computer-readable storage medium of claim 18, wherein the action suggestion engine receives the user input that is directed to the predicted action to be performed using the additional third-party application.

20. The non-transitory computer-readable storage medium of claim 15, wherein the indication of the predicted action to be performed using the additional third-party application includes one or more of: a title of the additional third-party application, a thumbnail for the additional third-party application, or a deep link for the additional third-party application.

* * * * *